Patented June 4, 1946

2,401,392

UNITED STATES PATENT OFFICE 2,401,392

SWEET POTATO PRODUCTS AND METHOD OF MAKING

Lamar Mims Ware, Hubert Harris, and William Aubra Johnson, Auburn, Ala., assignors to Alabama Polytechnic Institute, Auburn, Ala.

No Drawing. Application July 3, 1943, Serial No. 493,446

3 Claims. (Cl. 99—207)

This invention relates to sweet potato products and method of preparing the same. An object of the invention is to produce from sweet potatoes a highly palatable food in the form of crisps requiring no further cooking or processing before serving. Another object is to provide a highly nutritious food providing its own sugar and retaining substantially a major portion of the original carotene content of the potatoes. Another object is to provide a highly concentrated, energy-forming food which, for the food values represented, has a minimum weight and requires a minimum of space when stored or shipped. Another object is to provide a prepared food which will retain its value and quality over a long period of time. A product in conformity with these objects can be prepared in a number of different ways, in accordance with the invention, as will now be explained.

We first of all select sound, good quality sweet potatoes, preferably well-cured and of orange-colored or Puerto Rico types, although it will be understood that we do not limit ourselves as regards the types or varieties used. The potatoes are then carefully washed.

According to one procedure, the washed potatoes are next peeled, this operation including any necessary trimming. The peeled potatoes are then comminuted and by this we mean that they are sliced, chipped, diced, wafered, grated, shredded, or otherwise reduced. The comminution product is then subjected to a blanching operation, which operation comprises subjecting the product to live steam in a closed chamber, either without pressure or under low pressure for, for example, from 8 to 12 minutes, with the result that the potato pieces become translucent, are partially, i. e., more or less fully, cooked with a conversion of a substantial portion of their starch to sugar, the sugar content being increased from about 18 to 24% when raw, to about 35 to 40% when processed on a dry basis, and become soft enough to be easily mashed.

The thus blanched product may now be subjected to a primary, or partial, dehydrating step at temperatures preferably ranging from 140° F. to 180° F., with relative humidities ranging from 20 to 50%, and with rapid air circulation so that the moisture content is reduced to about 40% to 50% of the original. The dehydrator should be in connection with a source of steam to permit variations in humidity and preferably the operation is started with a relative humidity of 50% and finished with a relative humidity of 20%.

The product of the preliminary dehydrating step may then be extruded as by being passed through a ricer or other food machine so as to give an extrusion product which is riced or is in the form of filaments, ribbons, sticks, pellets, and the like. The primary dehydration reduces the moisture to such an extent that the extrusion product will not run together.

The extrusion product may now be subjected to a secondary dehydrating step which is carried on in the same manner as the first, but to a point at which the moisture content is reduced to about 5% to 10% of the original.

This dehydration product is now placed in a toasting oven or chamber in which is maintained a temperature ranging substantially from 230° F. to 300° F. (from 260° F. to 280° F. being the optimum range, and about 270° F. being the optimum temperature), with low humidity, i. e., relative humidity from 1% to 5%, and with rapid air circulation so that the moisture content of the final product ranges from about 2.5 to 4%. Like the dehydrators, the toasting chamber should be provided with humidity controls.

Or washed sweet potatoes may be peeled and comminuted and the comminution product cooked in super-heated moisture vapor for 35 to 50 minutes, at a temperature ranging from about 230° F. to 300° F. in an oven with relative humidities ranging from 10 to 30% or thereabouts and with a somewhat reduced rate of air circulation. The cooked product is mashed, extruded, and then toasted at a temperature ranging from about 230° F. to 300° F. with rapid air circulation until the product is crisp.

The crisp products thus arrived at are characterized by the absence of starchy taste, by enhanced sugar content due to starch conversion, and by a carotene content ordinarily from 50% to 60% of the original. The color is of dark orange-brown in the case of potatoes of orange-colored or Puerto Rico types. The crisps are nutritious and highly palatable, with a caramelized flavor and taste characteristic of a sweet potato, and may be eaten plain or, for example, with cream and sugar. If the toasting temperature has been above 290° F., the product will have a somewhat over-toasted flavor, still quite palatable and preferred by some, but for a product suited to the general taste we prefer to keep the toasting temperature within the optimum range above mentioned. If the toasting temperature has been below 230° F., the product is hard in texture and is characterized by a starchy taste unless the potatoes were boiled, baked, steamed, or otherwise cooked before toasting.

For the saving of time and equipment, steps in the above-described procedure may be variously by-passed. The comminution product may go directly to the toasting oven, but in this case the toasting step should include a preliminary blanching stage with high humidity, that is, relative humidities ranging from 8% to 30%. Under these conditions, there is at least a partial blanching effect due to the superheated moisture vapor. This relative humidity is maintained during the early part of the process, being later reduced to about 1% to 5% relative humidity with air being circulated rapidly in the toaster. Comminuted products going directly to the toasting oven at low humidities without prior blanching or cooking yield a final product starchy in taste and unattractive in color, irrespective of the temperatures in the oven. In the procedure just mentioned, dehydration takes place along with toasting.

The comminution product may be subjected to a separate blanching treatment as first described, and the blanched product may go directly to the toasting oven for dehydrating and toasting, or the blanched product may go to the primary dehydrator and then to the toasting oven. As other possibilities, the blanched product may go immediately to the extruder and thence direct to the toaster, or the secondary dehydrator may be used between the extruder and the toaster. Where the extruder is not employed, the cellular structure of the product is maintained.

According to another procedure, the washed potatoes can be cooked by boiling or steaming, with or without pressure, until fully done, or can be cooked by baking. Boiling usually requires fifteen minutes for potatoes one inch in diameter and ten to twelve additional minutes for each additional inch in diameter. Baking is done in a medium hot oven (275° F. to 400° F.) until the potatoes are well cooked (two to three hours) and the moisture content is reduced by about 20% to 40%.

After boiling or steaming, the potatoes are peeled, then subjected to primary dehydration, then to extrusion, then to secondary dehydration and then to toasting, the same conditions being maintained in the two dehydrators and toaster as in the first procedure and the final product being substantially the same. The secondary dehydrator can be by-passed and secondary dehydration carried out in the toaster. Or the potatoes can go from the peeler or from the first dehydrator to a masher-beater and thence to the extruder and toaster with or without treatment in the secondary dehydrator. In this latter procedure, after being mashed and beaten, the potatoes are preferably pressed through a fine screen before being extruded.

After baking, the potatoes are peeled, then extruded, and then can go directly to the toaster or, after peeling, they can be mashed and beaten and proceed thence to the extruder with or without the interposition of the screening step. It is also contemplated that the potatoes may first be fully cooked by boiling or steaming and then baked, the baking step being followed by the steps which have just been outlined.

The products resulting from the above-described procedures consist solely of sweet potato, no other ingredient having been added. The crisps have a color somewhat darker than that of the original potatoes and are particularly characterized by the absence of a starchy taste, by an enhanced sugar content resulting from the conversion of a portion of the potato starch, and by a carotene content which ordinarily is at least half or more of the carotene content of the original potatoes. The products can be modified by the addition of various ingredients, for example, as follows:

The whites of eggs, two, for example, are beaten stiff, mixed with each cup of boiled and/or baked potatoes, beaten until creamy, extruded, and toasted until crisp. The egg whites change the texture so materially as to give the product the characteristics of a cookie.

One-fourth cup, or thereabouts, of shredded cocoanut is finely ground and mixed with each cup of boiled and/or baked potatoes, beaten until creamy, extruded, and then toasted until crisp. The product has the characteristics of a macaroon. Beaten egg whites may be added if a lighter product is desired.

One-half cup, or thereabouts, of finely ground pecans is mixed with each cup of boiled and/or baked potatoes, beaten until creamy, extruded, and toasted. A more pronounced pecan flavor may be obtained by parching the pecans before they are ground.

One-fourth to one-half cup, or thereabouts, of finely ground peanuts is mixed with each cup of boiled and/or baked potatoes, beaten until creamy, extruded, and toasted until crisp. The peanuts may be parched before they are ground to give a more pronounced peanut flavor.

One-half to one well-ripened banana is mixed with each cup of boiled and/or baked potatoes, beaten until creamy, extruded, and toasted until crisp.

One-quarter cup or thereabouts of pineapple is mixed with each cup of boiled and/or baked potatoes, beaten until creamy, extruded, and toasted until crisp.

A candy bar may be made by pouring, just before removing from heat, coarsely ground or crushed material from any of the crisp extruded toasted products into a corn or cane syrup or into a combination of the two which has been cooked to a point where the candy poured on a cool surface and pressed out will give a crisp bar. The candy has been cooked to the proper degree when the temperature of the syrup reaches approximately 245° F. to 260° F. in the case of corn syrup, approximately 255° F. to 270° F. in the case of cane syrup, and approximately 250° F. to 270° F. in the case of a combination of the two.

It will be understood that the sweet potato product can be modified by the addition of other components which, as in the above examples, will be added in finely ground condition, in the case of solids, and beaten in with the boiled and/or baked potatoes after the latter have been peeled and, desirably, preliminarily mashed. The extrusion products can, of course, be subjected to a separate dehydrating step prior to toasting, but in the examples above given they go directly to the toasting oven so that dehydrating and toasting are carried out in one operation at a temperature substantially within the range of 230° F. to 300° F. and preferably as closely as possible to 270° F. with sufficient air circulation to maintain a uniform temperature throughout the oven.

While we have herein given preferred procedures, it will be understood that variations are possible and are contemplated under the claims which follow:

We claim:

1. The method of preparing a food product from sweet potatoes which comprises comminuting the washed and peeled potatoes, and subjecting the comminution product to a temperature of about 270° F. in an atmosphere having a relative humidity of from about 8% to 30% to effect partial blanching and then in an atmosphere having a relative humidity of from about 1% to 5% until crisp.

2. The method of preparing a food product from washed, peeled, and substantially fully cooked sweet potatoes, which comprises extruding the potatoes and toasting the extrusion product at a temperature sustained at about 270° F. until crisp.

3. The method of preparing a food product from sweet potatoes which comprises cooking the washed potatoes in the peel by baking until done, peeling the potatoes, extruding the peeled potatoes, and toasting the extrusion product at a temperature sustained at about 270° F. until crisp.

LAMAR MIMS WARE.
HUBERT HARRIS.
WILLIAM AUBRA JOHNSON.